United States Patent [19]
Wakamatsu et al.

[11] 3,832,981
[45] Sept. 3, 1974

[54] FUEL INJECTION CONTROL SYSTEM

[75] Inventors: Hisato Wakamatsu, Kariya; Kunio Endo, Anjo, both of Japan

[73] Assignee: Toyota Jidosha Kogyo Kabushiki Kaisha, Toyota-shi, Japan

[22] Filed: Aug. 24, 1971

[21] Appl. No.: 174,433

Related U.S. Application Data
[63] Continuation-in-part of Ser. No. 846,699, Aug. 1, 1969, abandoned.

[30] Foreign Application Priority Data
Aug. 7, 1968  Japan.............................. 43-55916
Sept. 10, 1968  Japan.............................. 43-65038

[52] U.S. Cl. ... 123/32 EA, 123/119 R, 123/140 MC
[51] Int. Cl.......................................... F02m 51/00
[58] Field of Search.................... 123/119 R, 32 EA

[56] References Cited
UNITED STATES PATENTS
3,456,628  7/1969  Bassot et al. ..................... 123/32 EA
3,612,009  10/1971  Kamazuka et al. .............. 123/32 EA

FOREIGN PATENTS OR APPLICATIONS
1,939,611  2/1970  Germany....................... 123/32 EA

*Primary Examiner*—Laurence M. Goodridge
*Attorney, Agent, or Firm*—Cushman, Darby & Cushman

[57] ABSTRACT

A fuel injection control system for controlling the timing and duration of an electrical driving pulse to electromagnetic fuel injection valves thereby controlling the timing and duration of fuel injected into combustion chambers of an engine. The control system utilizes a differential circuit to compare an electrical signal representing one engine parameter such as engine rpm with a synchronous sawtooth signal having a slope representing another engine parameter such as back pressure or to compare a first signal level with a sawtooth signal where at least one of the first signal level or the sawtooth slope is related to an engine operating parameter and to thereby generate the required driving pulses. Since the timing and duration of the driving pulses are determined entirely by comparison of electrical analogs of instantaneous engine parameters, the pulse duration is not critically dependent upon electrical circuit parameters such as RC time constants which often vary with age and/or environment.

16 Claims, 16 Drawing Figures

FIG. 10
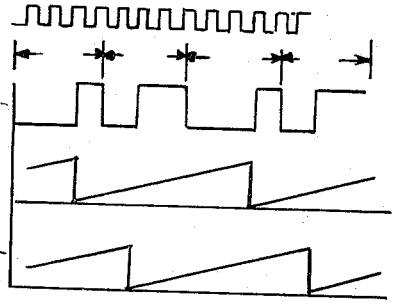
INPUT TO SAWTOOTH GENERATOR 10 FROM MONOSTABLE 9.
RESET INPUT TO 10 FROM 2 POLE PULSE GENERATOR
OUTPUT TO DIFF. AMP. 13 ON LINE 114
OUTPUT TO DIFF. AMP. 14 ON LINE 116
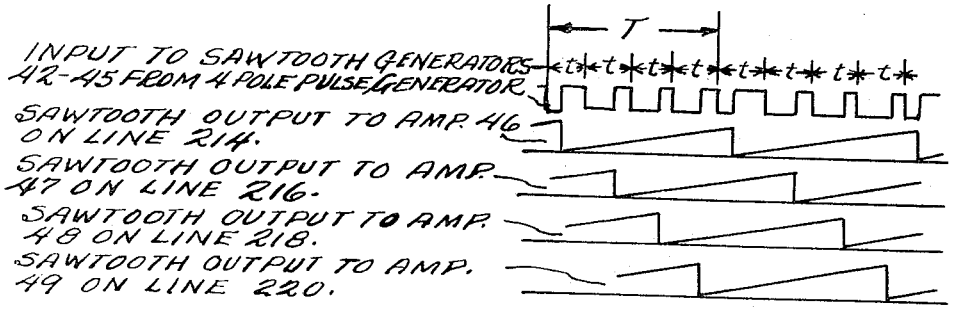
INPUT TO SAWTOOTH GENERATORS 42-45 FROM 4 POLE PULSE GENERATOR
SAWTOOTH OUTPUT TO AMP. 46 ON LINE 214.
SAWTOOTH OUTPUT TO AMP. 47 ON LINE 216.
SAWTOOTH OUTPUT TO AMP. 48 ON LINE 218.
SAWTOOTH OUTPUT TO AMP. 49 ON LINE 220.
FIG. 12

FUEL INJECTION CONTROL SYSTEM

This application is a continuation-in-part of our earlier copending application No. 846,699 filed Aug. 1, 1969, now abandoned.

The present invention relates to an electrically controlled fuel injection apparatus and more specifically to a control system included in such apparatus which generates control signals to be supplied to respectively associated injection valves.

A general control signal generating system of this type has been known wherein a monostable multivibrator is driven in synchronized relation to the rotation of an engine and a voltage impressed on the time-constant circuit of the monostable multivibrator is changed by the back pressure and the r.p.m. of the engine, whereby the width of the output pulse of such a system is changed. However, with such a monostable multivibrator system, it is impossible to control the width of the output pulses very precisely because the output pulse width is controlled by a change in the capacitance of a capacitor or by a change in the resistance of a resistor, used in the time-constant circuit of the monostable. Due to temperature variation, aging of the component parts, etc., the resulting change in these parameters caused by instantaneous engine operating parameters will not always produce the desired precise changes in output pulse durations.

For these reasons, it has been proposed to shift a master control signal (obtained from a single control signal generating circuit) and to distribute it appropriately to the individual cylinders thereby at least insuring that all engine cylinders have the same fuel injection duration even if this injection pulse width may in fact vary from the ideal due to undesired changes in circuit parameters, etc., as previously described. However, the current-conducting time required for the energization of an electromagnetic fuel injection valve is in the range of about 3 to 10 ms. Thus, for example, in a four-cycle, four-cylinder engine, the sequence or cycle of repeated injections becomes equal to the required current-conducting time for the electromagnetic valves at a point when the engine r.p.m. has reached a value of 3,000, and, therefore, the fuel injection signals under such prior methods cannot be controlled after the engine r.p.m. has exceeded such an r.p.m. as 3,000.

With a view to solving such problems, an attempt has been made to operate the injection valves by dividing them into two groups, each consisting of two valves (i.e., one-half the total) and then shifting the output of a single master pulse generator to the respective two groups of valves. However, such systems have experienced an added disadvantage in that the opening time and the injection time of the various suction valves in each group do not coincide with each other accurately for all cylinders thus making successful operation by this method most difficult at best.

It is, therefore, an object of the present invention to provide a novel fuel injection control system which eliminates all the aforesaid problems at once and makes highly accurate control of injection pulse width possible thereby effecting uniform fuel injection timing and duration for all cylinders. The invention includes means for detecting the back pressure of an engine, means for converting the back pressure detected by said detecting means into an electric back pressure signal and means for generating a timing signal synchronous with the motion of each suction valve of the engine. In addition, means are provided for repeatedly performing an integration or otherwise to produce a ramp or sawtooth signal in synchronized relation to said synchronous timing signal thus having a slope related to engine r.p.m. and a period also corresponding to the r.p.m. Then, further means are provided for generating a reference signal according to a control characteristic of the engine which reference signal has been corrected by the rotational speed of the engine. Means for combining any two of the said signals, i.e., the back pressure signal, the ramp or sawtooth signal and the reference signal with each other is provided. A differential amplifier circuit is then adapted to produce an output of constant amplitude upon detecting a predetermined comparison of the two combined signals with the remaining one of said three signals and means are provided for distributing the output of said differential amplifier circuit to the respective electromagnetic fuel injection valves in sequence according to the output of said synchronous signal generating means.

This and other objects, features and advantages of the present invention will become apparent from the following detailed description when taken in conjunction with the accompanying drawings, in which like reference numerals denote like elements throughout the various Figures:

FIG. 10 is a graph showing some of the signal waveforms occurring in the circuit of FIG. 9;

FIG. 12 is a graph showing some of the signal waveforms occurring in the circuit of FIG. 11;

Figure 1:
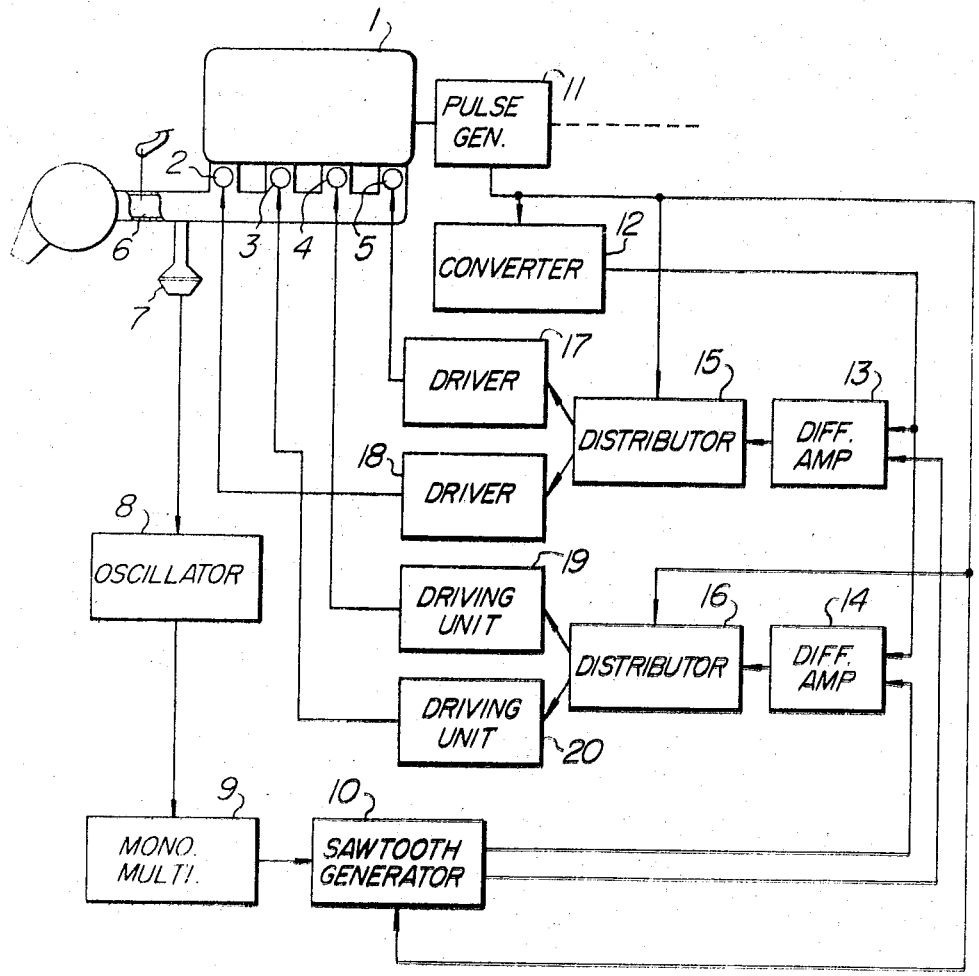
FIG. 1 is a block diagram of an embodiment of the present invention.

Referring first to FIG. 1, electromagnetic valves 2, 3, 4 and 5 (a four-cylinder engine is used for explanation purposes only) are provided in a suction manifold of an engine 1 at locations close to respective cylinder suction valves, for injecting fuel into the cylinders of the engine, and a throttle valve 6 is provided in that end portion of said suction manifold remote from the engine, said throttle valve being operatively connected to an accelerator pedal for operation thereby. Provided downstream of the throttle valve 6 (or on the side closer to the engine 1 with respect to the throttle valve) is a back pressure detector 7 which may comprise a diaphragm type of transducer for obtaining physical motion related to the manifold back pressure as will be apparent to those in the art.

Figure 2:
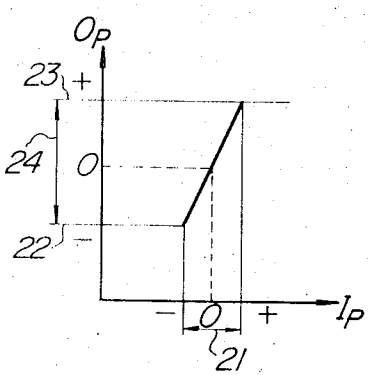
FIG. 2 is a diagram showing the characteristic of the differential amplifier provided in the system of FIG. 1.

An oscillator 8 is connected with the back pressure detector 7 and the oscillation frequency of said oscillator 8 is varied by a change in the back pressure detected by the back pressure detector 7. Reference numeral 9 designates another oscillator consisting, for example, of a monostable multivibrator, which is adapted to generate a pulse of a constant width, and 10 designates a sawtooth generator adapted to generate a sawtooth wave synchronous with the engine r.p.m. and consisting of a combination of an integrating circuit and a switching circuit, and further comprises a circuit of the type shown in FIG. 3 in a number equal to the number of differential amplifiers to be described later. Reference numeral 11 designates a pulse generator operated in synchronized relation to the operation of each suction valve for generating a pulse synchronous with the engine r.p.m. and 12 designates a converter by which the output of said pulse generator 11 is converted into d.c. voltage. Reference numerals 13, 14 designate differential amplifiers which serve to compare the outputs of the sawtooth generator 10 and the converter 12 with each other and to produce an output of an appropriate width synchronous with the opening time of the associated suction valves, and the outputs of the respective differential amplifiers 13, 14 are distributed to driving units 17, 18, 19 and 20 of the respective injection valves by distributors 15, 16 according to instructions from the pulse generator 11, to drive the electromagnetic valves 2 to 5. FIG. 2 is a characteristic diagram showing the relationship between the input and output of the differential amplifiers 13, 14, the axis of the abscissa representing input $I_P$ and the axis of the ordinate representing output $O_P$. Referring to FIG. 2, the width of a differential input active region 21 is only several millivolts. When the input exceeds this millivolt region, the output becomes a negative saturation voltage represented by a line 22 in case of the differential input being negative, and becomes a positive saturation voltage represented by a line 23 in case of the differential input being positive, the voltage differential 24 therebetween being substantially equal to a source voltage (10–15 IV).

Figure 3:
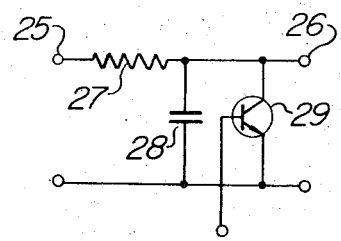
FIG. 3 is a wiring diagram of the integrator provided in the system of FIG. 1.
Figure 4:
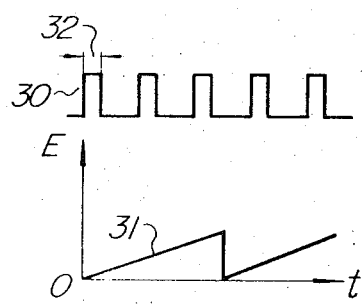
FIGS. 4 and 5 are diagrams showing the input waveform and output waveform respectively of the integrator shown in FIG. 3.

FIG. 3 is an electric connection diagram showing the basic circuit of the sawtooth generator 10, which is so designed that when a pulse of a constant width from the oscillator 9 is imposed on an input terminal 25, a sawtooth wave, synchronous with the engine r.p.m. and having a slope or rise inclination proportional to the pulse frequency, is obtained from an output terminal 26 by an integrating resistor 27, an integrating capacitor 28 and a switching transistor 29. FIG. 4 is a diagram showing the relationship between the input pulse 30 and the output sawtooth wave 31 of the sawtooth wave generating circuit 10, in case of the back pressure of the engine being law, and the input pulse width 32 is constant, irrespective of the frequency of the sawtooth wave.

Figure 5:
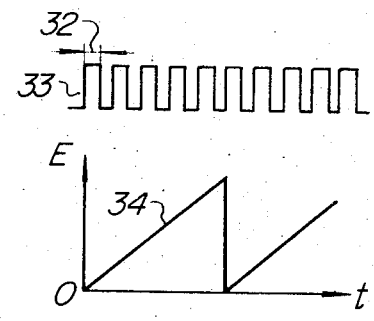

FIG. 5 is a diagram showing the relationship between the input pulse wave 33 and the output sawtooth wave 34 of the sawtooth wave generator 10, in case of the back pressure of the engine being high. In the diagrams of FIGS. 4 and 5, the abscissa is scaled by time $t$ and the ordinate by voltage E respectively.

Figure 6:
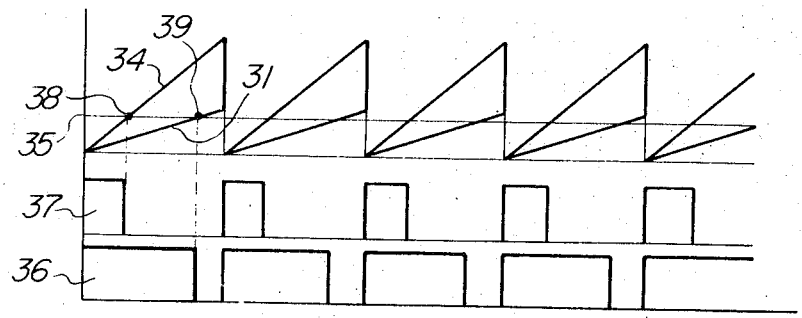
FIG. 6 is a diagram showing the relationship between the input and output pulse widths of the differential amplifier.

FIG. 6 is a diagram showing the input and output waveforms of the differential amplifiers 13, 14 to illustrate the relationship between an output pulse 36 of said differential amplifiers when the output 31 of the sawtooth generator 10 is impressed, and an output 37 of the same when the output 34 of said sawtooth generator 10 is impressed, on the noninverted input side of said differential amplifiers, with the inverted input side of said differential amplifiers being impressed with a reference voltage 35 from the converter 12.

The injection control system of the present invention constructed as described above operates in the following manner: Namely, when the throttle valve 6 is opened, with the engine 1 rotating, for accelerating the engine, the back pressure in the suction manifold becomes small and the frequency of the oscillation generated by the oscillator 8 is decreased by the action of the back pressure detector 7, so that the input pulse of the sawtooth generator 10 takes the form as indicated by 30 and a sawtooth wave as indicated by 31 is given to the differential amplifier 13. On the other hand, the differential amplifier 13 is given the reference voltage 35 from the converter 12. In a period when the sawtooth voltage 31 is lower than the reference voltage 35, the differential amplifier 13 generates the output voltage 22 which is given to the electromagnetic valve 2 or 5 to open the same.

As the sawtooth voltage 31 continues to rise and reaches an intersection 39 with the reference voltage 35, shown in FIG. 6, the noninverting input of the differential amplifier 13 becomes higher than the inverting input to saturate the amplifier 13 in an opposite sense so that the output voltage of said differential amplifier is inverted to the positive side, providing a signal for closing said electromagnetic valve, and during this period an output pulse 36 is supplied to the distributor 15. The distributor 15 discriminates (i.e., determines) whether the signal should be given to the driving unit 17 or 18 by means of a pulse from the pulse generator 11 and to drive the electromagnetic valves 2 and 5 alternately. Therefore, the fuel supplied to the engine 1 is increased.

The differential amplifier 14 and the distributor 16 operate in the same manner as the differential amplifier 13 and the distributor 15, except with a phase difference corresponding to the crank angle as should be apparent.

Now, when the throttle valve 6 is closed to reduce the engine r.p.m., the back pressure of the engine becomes large, so that the frequency of oscillation of the oscillator 8 increases and the input of the sawtooth generator 10 takes the form as indicated by 33. Therefore, the sawtooth voltage 34 is given to the differential amplifier 13 and said differential amplifier is inverted or switched over earlier at a point 38 in FIG. 6, (similarly with respect to the differential amplifier 14 except for phase differences) and gives an output pulse 37 to the distributor 15. The driving units 17, 18 operate the electromagnetic valves 2 and 5 according to the pulse width with which they are driven, whereby the fuel supply to the engine 1 is decreased.

Accordingly, in the manner described above, the timing, sequence and duration of opening time of the electromagnetic valves 2 to 5 is precisely controlled in response to a positional change of the throttle valve 6, so that the fuel quantity may be regulated to a value previously set in relation to the back pressure and r.p.m.

Thus, in the FIG. 1 embodiment, the manifold pressure is detected as a frequency proportional to pressure by means of the pressure detector 7 and the oscillator 8 (namely, the frequency is high when the pressure is low, and it is low when the pressure is high), and the monostable multivibrator 9 (which produces a predetermined constant pulse width) is driven by this variable frequency. The output of the monostable multivibrator 9 is then fed to an integration circuit having a predetermined time-constant (a constant product of C.R) in the sawtooth generator 10, whereby a voltage is obtained, the change per unit time (the change in the slope of the sawtooth wave) of which varies according to a change in the frequency which is, in turn, proportional to the manifold pressure. The sawtooth generator 10 is constructed as shown in FIG. 3, and a voltage integrated by the resistor 27 and the capacitor 28 is discharged at each period of injection by the transistor 29 (which is triggered by a reset circuit connected to the pulse generator 11), whereby a sawtooth wave of a different slope having a frequency synchronized with the engine r.p.m. as indicated at 31 in FIG. 4 to 34 in FIG. 5 can be obtained as a function of the manifold pressure.

This sawtooth shaped output is introduced into one input of the differential amplifiers (comparators) 13, 14 in FIG. 1 whose output levels are inverted when the sawtooth reaches substantially the same level as the reference voltage, whereby a rectangular wave signal is obtained from the differential amplifiers to control the current supply to the electromagnetic valves 2, 3, 4 and 5.

For instance, an opening period of the electromagnetic valves 2, 3, 4 and 5 can be controlled by arranging the circuits such that signals for opening the valves are generated with the sawtooth output voltage is lower than the reference voltage (indicated at 35 in FIG. 6). Alternatively, the opening period of the electromagnetic valves may be controlled similarly to FIG. 1 by the arrangement shown in FIG. 7 (later explained in more detail) wherein sawtooth waves of the same rising characteristic (slope) and having a period determined by the pulse generator 11 (e.g., the contact of a distributor) are generated by the sawtooth generators 42 to 45 coincidentially with the injection times of the respective cylinders, while the reference voltage (depending on the negative pressure in the intake manifold, the engine r.p.m., etc.) is generated by the adjusting circuit 41 in FIG. 7, and both voltages are fed to a plurality of differential amplifiers (comparators) 46 to 49.

As described above, the fuel injection control system of the present invention is so designed that each of the electromagnetic valves 2 to 5 are opened in response to a rectangular pulse generated by the differential amplifier 13, 14 or 46 to 49 only when the sawtooth voltage generated by the sawtooth generator 10 or 42 to 45 is lower than the reference voltage generated by the converter 12 or 40, and the valve opening period is controlled by changing the sawtooth pulse or the reference voltage according to varying instantaneous engine parameters.

Figure 9:
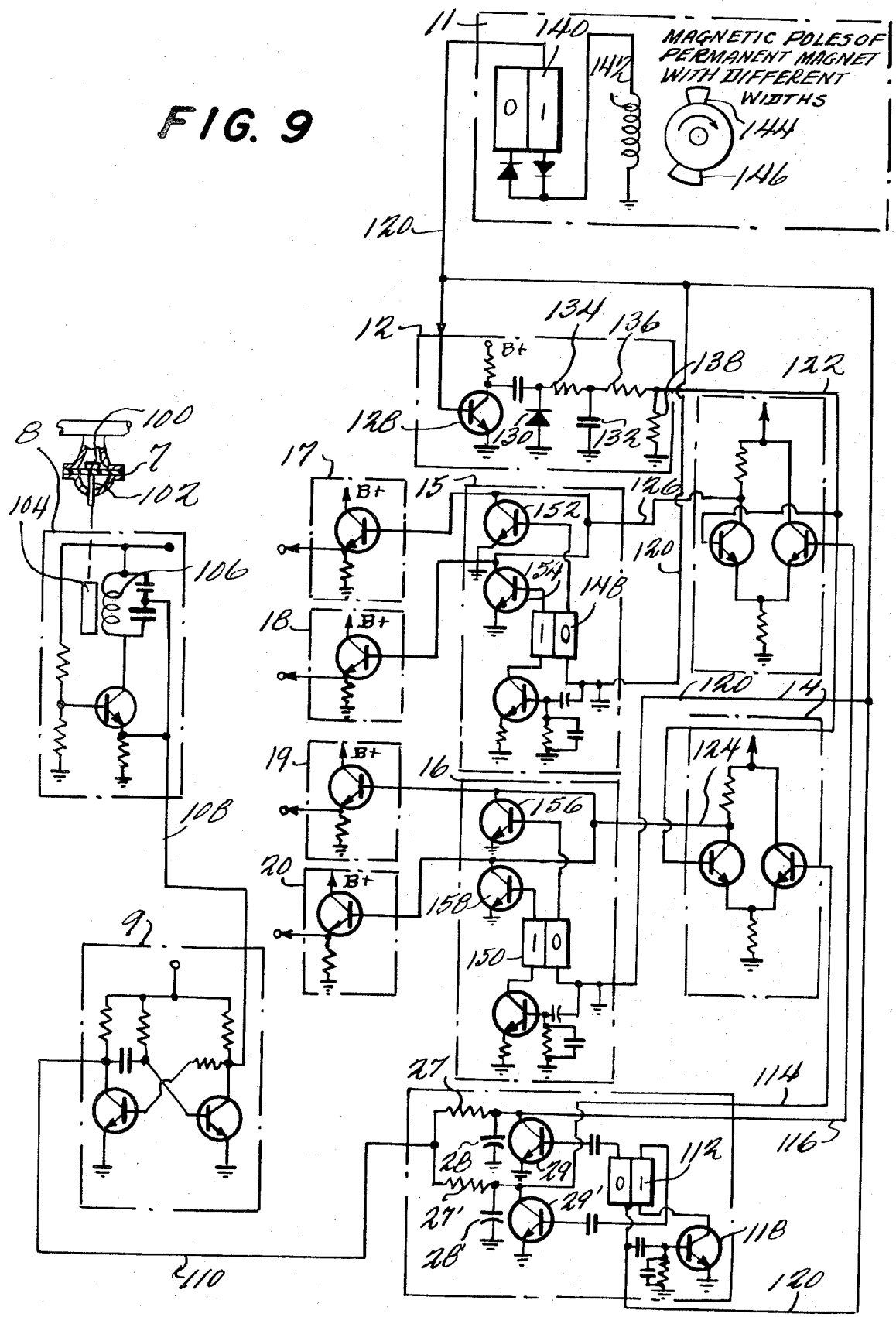
FIG. 9 is a more detailed schematic diagram of the FIG. 1 embodiment.

The circuit details of exemplary conventional circuits that may be used for the FIG. 1 embodiment are shown in FIG. 9.

Here, back-pressure detector 7 comprises a diaphragm 100 which is exposed to the existing manifold back-pressure on one side and to a different pressure (such as the ambient or a partial vacuum) on the other side as should be apparent to those in the art. An attached plunger 102 moves with movements of the diaphragm and is connected to an inductive slug 104 which thus moves with respect to the turns of an inductor 106 in response to variations of the manifold back-pressure which causes movements of the diaphragm 100.

The variable frequency oscillator 8 comprises a conventional Colpitts transistor oscillator (as may be found for instance on page 210 of the 1964 seventh edition of the General Electric "Transistor Manual") with the inductor of the Colpitts circuit being variable inductor 106. Thus, as the inductive slug 104 moves in response to changes in the back-pressure of the engine manifold, the inductance of the Colpitts' resonant circuit is varied to cause a variable output frequency on line 108.

The variable output frequency from the variable frequency oscillator (VFO) 8 is used to trigger a monostable multivibrator 9. Since the monostable 9 has fixed RC elements, its time constant or characteristic period of "on" time after being triggered from a quiescent "off" state is a constant such that constant width output pulses are obtained, one output pulse being obtained for each positive going trigger pulse applied over line 108. (A typical circuit for such a conventional monostable multivibrator is shown on page 319 of "Transistor Circuit Analysis and Design" by Fitchen, published by D. vanNorstrand Co., Inc., 1960.) Accordingly, the output from monostable 9 on line 110 will comprise a series of uniform constant width pulses having a repetition rate or frequency equal to the frequency of the output from variable frequency oscillator 8 and hence related to the engine manifold back-pressure in a predetermined manner as previously described.

Since a four-cylinder engine is being used in this exemplary embodiment, there are two integrating circuits (as shown in FIG. 3) utilized in the sawtooth generator 10. The upper one (comprising elements 27, 28 and 29) is utilized for controlling injection valves 2 and 3 while the lower one (comprising 27', 28' and 29') is utilized for controlling injection valves 4 and 5. The proper phasing between the ramp outputs of the upper and lower integrating circuits (i.e., between the sawtooth waveform outputs of these integrating circuits) is maintained by a resetting flip-flop 112. (Those skilled in the art will readily appreciate that flip-flop 112 is of conventional design and may, for instance, be similar to the bistable multivibrator or flip-flop shown on page 320 of "Transistor Circuit Analysis and Design" by Fitchen, previously cited.)

Assuming that the flip-flop 112 has just attained its presently indicated state (i.e., 0,1 which, for example, may indicate that the left active element is "on" while the right active element of the flip-flop is "off") the connections shown would have caused transistor 29' to have just discharged capacitor 28' (by virtue of a positive going pulse through the coupling capacitor) thereby causing the sawtooth waveform on line 114 to have just been reset to its low or ground point and to begin building again towards its high point with a slope proportional to the frequency or repetition rate of the input pulses along line 110 (i.e., proportional to the rate at which charge is accumulated by the storage capacitor 28'). Correspondingly, at a later subsequent time, when flip-flop 112 again changes state (i.e., to the 1,0 state) transistor 29 will cause a similar discharge of capacitor 28 to result in a resetting of the sawtooth waveform on line 116, again having a slope proportional to the frequency or repetition rate of input pulses along line 110.

Transistor 118 and its associated elements and interconnections with flip-flop 112 are utilized in a conventional manner to trigger or toggle the flip-flop 112 from its existing state to the other state each time a input trigger or reset pulse is presented along line 120 from the r.p.m. pulse generator 11 and to positively reset the flip-flop 112 to the 0,1 state each time a reference r.p.m. pulse of a predetermined longer duration is received. That is, the r.p.m. pulses on line 120 are directly connected to toggle or flip the bistable multivibrator 112 to its opposite state upon receipt of any positive going pulse edge from generator 11. (In FIG. 9, the "toggle" input to flip-flop 112 is shown as a midpoint connection to the lower side of the box.) However, to insure synchronous operation, provisions are made for positively resetting flip-flop 112 to a fixed predetermined state at least once for each engine cycle. Thus, one of the r.p.m. pulses for each engine cycle is different from others and is utilized as a synchronizing reference pulse. For instance, in the exemplary embodiment, once each engine cycle, the pulse generator 11 puts out a wider than usual r.p.m. pulse. The input RC circuit to transistor 118 has a time constant such that transistor 118 is turned "on" to positively reset flip-flop 112 to the 0,1 state when this longer duration synchronizing reference pulse is received on line 120. Thus synchronous operation is assured as should now be apparent. Thus, the sawtooth waveforms on lines 114 and 116 shown in FIG. 10 are reset in synchronism with the leading edge of pulses from the r.p.m. generator 11 and have a slope which is proportional to the frequency or repetition rate of pulses input on line 110 which is, in turn, related in a known manner to the engine manifold back-pressure.

Lines 114 and 116 are connected to the noninverting inputs of differential amplifiers 14 and 13 respectively as shown in FIG. 9. Differential amplifiers 13 and 14 are of conventional design similar to that shown on page 20 of "Pulse and Digital Circuits" by Millman and Taub published by McGraw-Hill Book Company, Inc. 1956, and having input vs. output characteristics as previously described with respect to FIG. 2. The other inverting inputs to amplifiers 13 and 14 are commonly connected to the output of a frequency-to-voltage converter 12 which produces a reference voltage on line 122 proportional to the engine speed or r.p.m. Accordingly, as previously described, when the ramp or sawtooth voltage on lines 114 or 116 exceeds the reference voltage on line 122, the differential amplifiers 14 and 13 respectively will be switched to their opposite states of saturation to cause a change in the level of output voltage on their respective outputs 124 and 126.

The frequency-to-voltage converter 12 is also of conventional design utilizing a simple drive transistor amplifier 128 which is capacitively coupled to a half-wave rectifier 130 and a smoothing circuit comprising capacitor 132 and resistor 134, 136 and 138 all having a predetermined time constant as will be apparent to effectively integrate the input pulses over some time span to approximate an analog voltage proportional to input frequency. Accordingly, as the frequency of input triggering pulses on line 120 from the pulse generator 11 increase, the storage capacitor 132 will accumulate charge and cause a corresponding increase in the d.c. output voltage on line 122. Correspondingly, when the frequency of the input trigger on line 120 decreases, the charge on storage capacitor 132 will subsequently leak away to a new lower equilibrium point to result in a lower output d.c. voltage on line 122 corresponding to the new lower r.p.m. value.

The pulse generator 11 comprises a conventional flip-flop or bistable multivibrator 140 which is connected for triggering to one state upon receiving a positive going pulse from coil 142 and to its other state upon receiving a negative going pulse therefrom via the diode connections as shown. Pulses of electrical energy are induced by the magnetic poles 144 and 146 as they are driven past coil 142 through a mechanical coupling to an engine-driven shaft as shown in FIG. 9. For instance, the magnetic poles 144 and 146 may be coupled to the engine camshaft and arranged circumferentially so as to cause triggering of flip-flop 140 at predetermined times with respect to the desired opening times for electromagnetic valves 2, 3 and 4, 6 respectively as should now be apparent to those in the art.

Now, the rectangular output signals on lines 126 and 124 (and having predetermined desired time durations corresponding to the instantaneous engine r.p.m. and manifold back-pressure as shown in FIG. 6) must be directed or distributed to the correct electromagnetic valve (i.e., either 2 or 3 for the rectangular signal on line 126 and either 4 or 5 for the rectangular signal on line 124). This distribution is accomplished by distributors 15 and 16 which essentially comprise a conventional flip-flop or bistable multivibrator 148 and 150 respectively in this exemplary embodiment, of course, if more than four cylinders are used in the engine, then more bistables must be used with connections as a binary counter to provide the necessary number of stable states as should now be apparent.

As previously described with respect to flip-flop 112, the flip-flops 148 and 150 are each connected for triggering or toggling from their existing state to their other opposite state each time a trigger pulse is received over line 120 as shown in FIG. 9. Additionally, a positive resetting to the 1,0 state is caused by an associated reset transistor and RC input circuit for each synchronizing reference pulse as previously described. Each of the two possible output states from the flip-flops 148 or 150 are utilized to trigger respective gating transistors 152, 154 and 156, 158 respectively. In turn, the outputs from these gating tansistors are utilized to drive conventional common emitter transistor amplifiers or drivers 17, 18 and 19, 20 respectively which provide outputs for driving the electromagnetic valves 2, 3 and 4, 5.

Accordingly, as shown in FIG. 9, flip-flops 148 and 150 have just been toggled to a state which disables gates 154 and 158 (by causing these gate transistors to go into saturation and thus grounding their collector electrodes) and opens gates 152 and 156 thus permitting the signals on lines 126 and 124 to pass respectively to drivers 17 and 19 whereby properly phased fuel injection timing pulses having a duration determined by the instantaneous engine r.p.m. and manifold back-pressure are sequentially applied to the fuel injection valves 2 and 4 as should now be apparent. Of course, upon the next trigger pulse on line 120, flip-flops 148, 150 and 112 will be all toggled to their opposite states thus permitting pulses of the proper timing and duration to then be channeled to drivers 18 and 20 for driving the electromagnetic fuel injection valves 3 and 5 respectively as should now be apparent.

Figure 13:
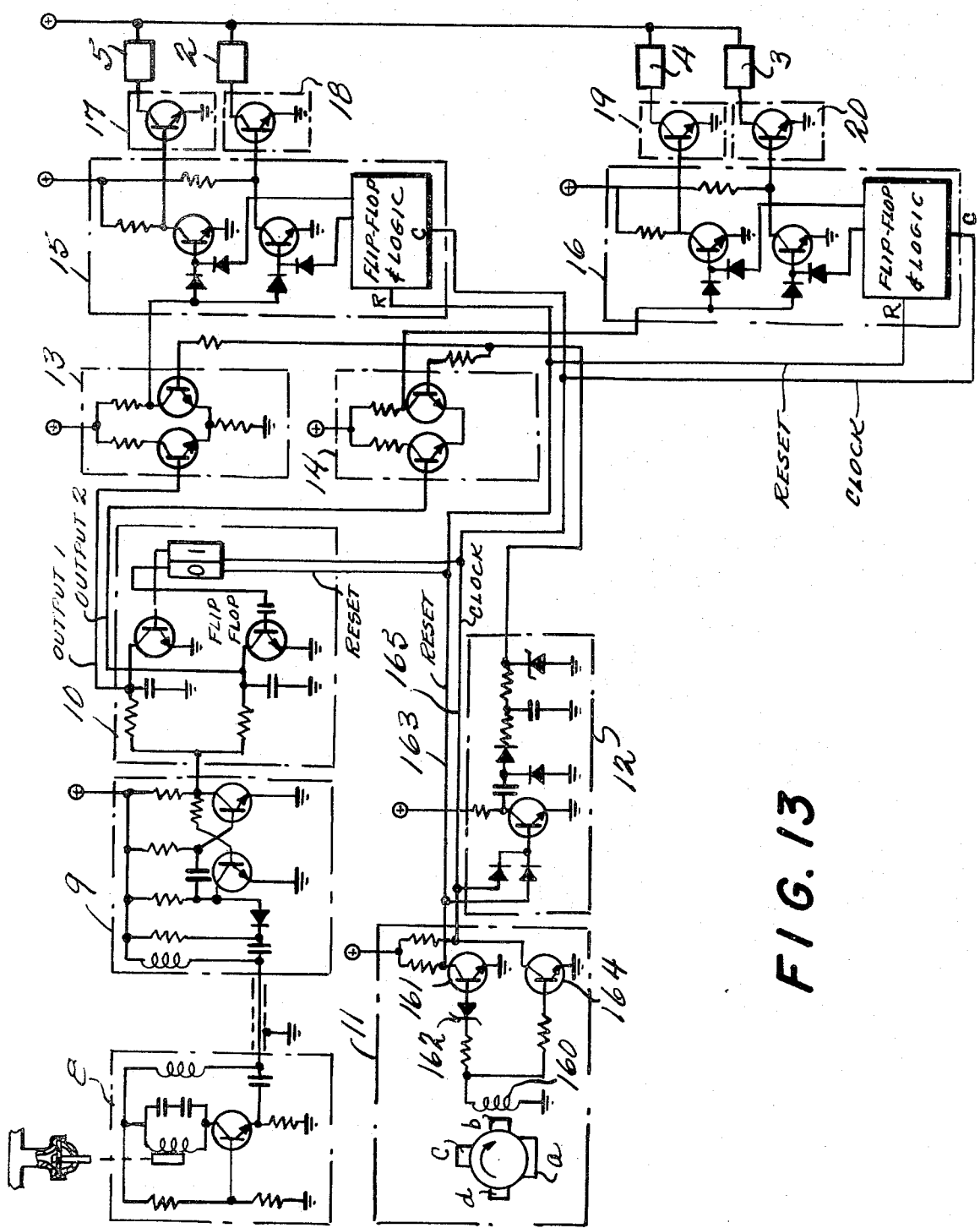
FIG. 13 is a circuit diagram showing another example of a possible detailed construction for the embodiment of FIG. 1.
Figure 14:
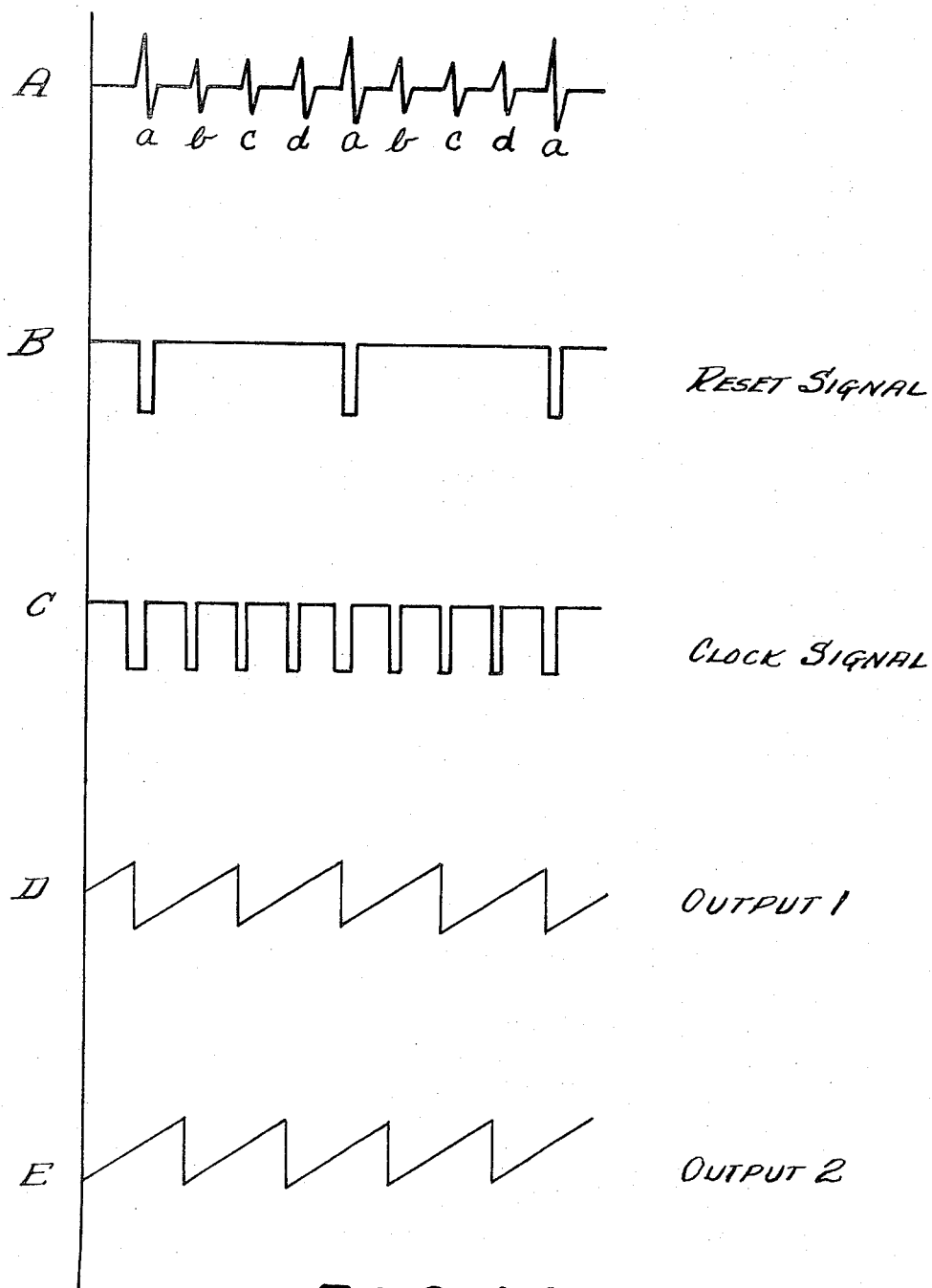
FIG. 14 shows waveforms appearing at several portions of the circuit of FIG. 13.

FIG. 13 shows another example of a possible detailed circuit construction of the above-described embodiment of FIG. 1. The injection timing, that is, the timing of the actuation of the electromagnetic valves 2 to 5, is determined by detecting the positions of revolving magnets a, b, c and d through a sensor coil 160 in the pulse generator 11. One of the magnets, namely the magnet a, has a width different from those to the other magnets. Thus, a larger pulse is induced in the sensor coil at every four pulses as shown at A in FIG. 14. One of the transistors (161) in the generator 11 discriminates or detects the larger pulse (due to the presence of Zener diode 162 as should be apparent) and provides reference pulses used as reset signals on line 163 as shown at B in FIG. 14. The other transistor 164 provides a train of clock signal pulses on line 165 corresponding to all the respective pulses from generator 11 as shown at C in FIG. 14.

These clock and reset pulse signals are both led to the sawtooth generator 10 and the distributors 15 and 16 as shown in FIG. 13. The sawtooth generator produces two sawtooth outputs as shown at D and E in FIG. 14. These sawtooth waveforms have a common slope which is determined by the output of the oscillator 8 as should now be apparent.

Thus, each of the differential amplifiers 13 and 14 provides an output signal for two cylinders (the amplifier 13 providing an output for the electromagnetic valves 4 and 5 and the amplifier 14 providing an output for the electromagnetic valves 2 and 3). The distributors 15 and 16 then "distribute" the outputs of the amplifiers to the corresponding electromagnetic valves in response to the reset signals and clock signals coming from the pulse generator 11. That is, the flip-flop and logic circuits in the distributors 15 and 16 determine to which valve each of the inputs should be applied.

The oscillator 8 oscillates at a frequency proportional to the negative pressure and the monostable multivibrator 9 provides output pulses of a constant pulse width and having a frequency equal to the frequency of the oscillator 8, so that the slopes of the sawtooth outputs of the sawtooth generator are proportional to the negative pressure, which is smaller with a lower negative pressure when the engine produces power as shown in FIG. 4 and larger with a higher negative pressure when the engine does not produce power as shown in FIG. 5.

With respect to the correction according to the engine speed (which is small as compared with the correction according to the negative pressure), the output pulses of the pulse generator 11 are converted to an analog voltage D through the converter 12 which may be corrected to have desired characteristics as those in the art will appreciate. The output of the converter 12 is then fed to differential amplifiers 13 and 14. The differential amplifiers 13 and 14 compare the sawtooth outputs described above and the output of the converter 12 to produce outputs which are applied to the distributors 15 and 16 as shown in FIG. 6 in which the output 37 corresponds to when the negative pressure is high and the output 36 when the negative pressure is low.

Figure 7:
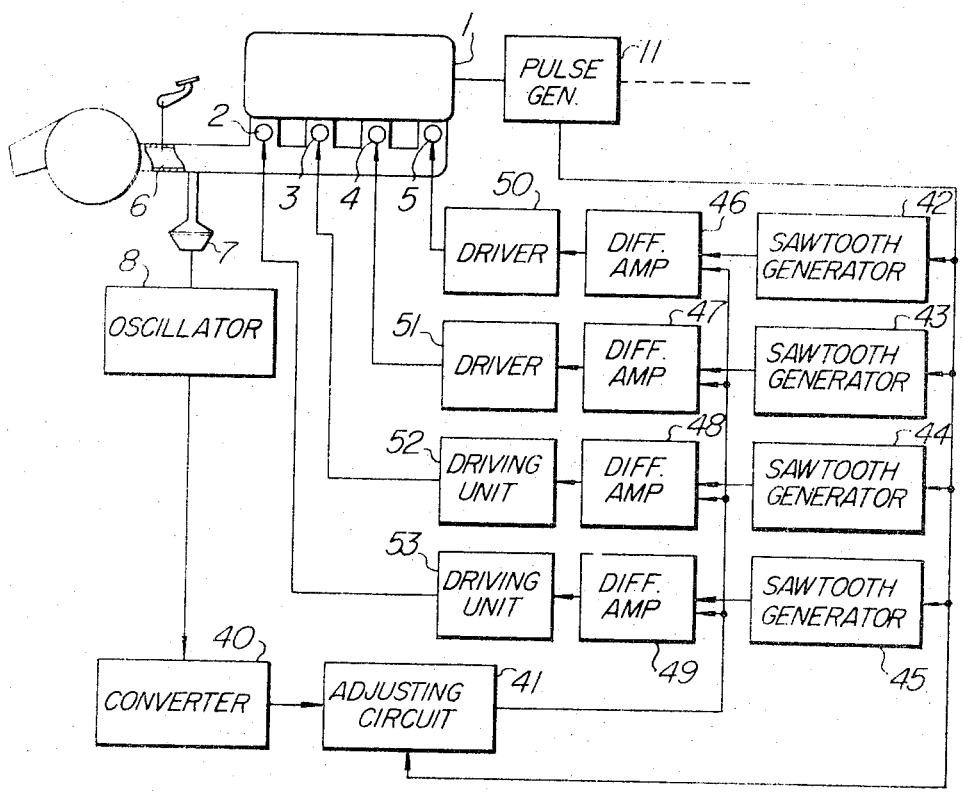
FIG. 7 is a block diagram of another embodiment of the present invention.

Another embodiment of the present invention will be described with reference to FIG. 7. In FIG. 7, an engine 1, electromagnetic valves 2, 3, 4 and 5 for controlling fuel injection, a throttle valve 6 operatively connected to the accelerator pedal, a back pressure detector 7, an oscillator 8 the frequency of which is variable according to the back pressure of the engine, and a pulse generator 11 correspond to the components of the same reference numeral shown in FIG. 1. Reference numeral 40 designates a frequency-voltage converter by which a change in frequency of the oscillator 8 is detected as a voltage change and which is so designed that its output voltage becomes low when the value of back pressure is large, and becomes high when the value of back pressure is small. Reference numeral 41 designates an adjusting circuit adapted to generate a control voltage for regulating the fuel supply to the engine 1 from time to time according to the back pressure of the engine, in response to the output voltage of the converter 40 which is increased or decreased according to the back pressure and engine r.p.m. Sawtooth generators 42, 43, 44 and 45 are so designed as to generate sawtooth waves according to the fuel injection starting times of the respective associated cylinders and further to generate sawtooth waves of the same form upon adjusting for possible differences in inclination or slope of the sawtooth waves resulting from a discrepancy of the respective circuit constants. Differential amplifiers 46, 47, 48 and 49 are respectively so designed as to compare the outputs of the sawtooth generators 42, 43, 44 and 45 with the output of the adjusting circuit 41, and to generate an output which is variable according to the output differential detected. Electromagnetic valve driving untis 50, 51, 52 and 53 energize and deenergize the respective electromagnetic valves 5, 4, 3 and 2 associated therewith in response to the output signals of the differential amplifiers 46, 47 48 and 49. The characteristics and the functions of the differential amplifiers 46, 47, 48 and 49 are substantially the same as those explained with reference to the embodiment of FIG. 1.

The system according to this invention constructed as shown in FIG. 7 operates in the following manner: Namely, when the accelerator pedal 6 is actuated to accelerate the engine 1, with said engine running, the throttle valve 7 is opened and, therefore, the back pressure in the suction maniform is lowered, so that the back pressure detector 8 is actuated and the inductance in the circuit of the oscillator 9 is changed, whereby the oscillation frequency of said oscillator is increased. The output of the oscillator 9 is converted into voltage by the frequency-voltage converter 40 and the voltage thus created is adjusted to a value corresponding to the back pressure and r.p.m. of the engine, by the action of the adjusting circuit 41. After adjustment, the voltage is impressed on one of the input terminals of the differential amplifier 46. On the other hand, the sawtooth generator 42 generates, in response to a signal from the pulse generator 11, a sawtooth voltage, indicated by 62 in FIG. 8, in synchronized relation to the injection starting time of the associated cylinder, and impresses said sawtooth voltage on the differential amplifier 46. In this case, if the sawtooth voltage 62 is lower than the control voltage 60, the differential input of the differential amplifier 46 is in the positive saturation range, so that the output voltage thereof falls in the range indicated by 23 in FIG. 2. The electromagnetic valve driving unit 50 is actuated by the output signal of the differential amplifier 46, sending a signal to the electromagnetic valve 5 to open the same. When the sawtooth voltage 62 rises and reaches a point 67, beyond which said sawtooth voltage is higher than the control voltage 60, the differential input of the differential amplifier 46 is inverted to fall in the negative saturation range and the output voltage thereof falls in the region indicated by 22 in FIG. 2, so that the signal being supplied to the electromagnetic valve 5 from the driving unit 50 is interrupted, with the result that the electromagnetic valve 5 is closed. Namely, the electromagnetic valve 5 is held open to permit fuel injection, only for a period corresponding to the pulse width 65 shown in FIG. 8. Then, the sawtooth generator 42 again receives an injection starting signal from the pulse generator 11 and generates the next cycle of the sawtooth voltage 62, whereupon the differential amplifier 46 generates another pulse 63 in the same manner as described above. The differential amplifiers 47, 48 and 49 operate in the same manner as the differential amplifier 46, with a phase difference corresponding to the crank angle. Thus, it is possible to supply the pulse 63, the width of which is determined by the inclination of the sawtooth wave 62 and the value of the control voltage 60, to each of the electromagnetic valves in synchronized relation to the fuel injection time for the associated cylinder, and further the engine 1 is accelerated because the width 65 of the pulse 63 thus generated is larger than before actuation of the accelerator pedal.

Figure 8:
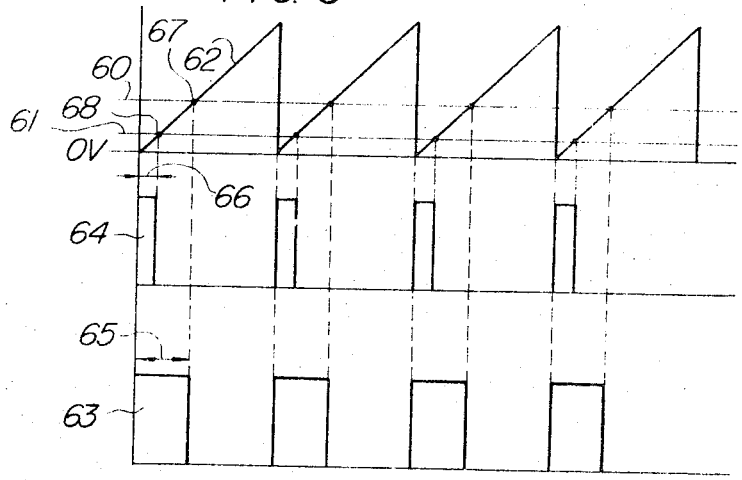
FIG. 8 is a diagram showing the relationship between the input and output pulse widths of the differential amplifier provided in the system shown in FIG. 7.

Now, when the pressure is removed from the accelerator pedal to decelerate the engine, the throttle valve 7 is closed, so that the back pressure of the engine rises and the oscillation frequency of the oscillator 9 is decreased by the action of the back pressure detector 8, and at the same time the output voltage of the frequencyvoltage converter 40 falls. When a control voltage 61 shown in FIG. 8 is given to the differential amplifier 46 as the output voltage of the adjusting circuit 41, said differential amplifier 46 is inverted at the point 68 and gives a pulse 64 to the electromagnetic valve driving unit 50, whereby the associated electromagnetic valve 5 is opened for fuel injection only for a period corresponding to the pulse width 66. Therefore, the quantity of fuel supplied to the engine is decreased to be smaller than before and the engine 1 is decelerated accordingly. It will be seen from the foregoing description that the fuel injection can be controlled properly by controlling the electromagnetic valves 2, 3, 4 and 5 in such a manner that the quantity of fuel injected may be regulated to a predetermined value, according to the back pressure of the suction gas and the engine r.p.m. which are variable dependant upon and the degree of actuation of the accelerator pedal.

As described above, according to the present invention the width of a pulse supplied to the electromagnetic valve is determined by making use of the fact that the saturation point of the output of a differential amplifier is inverted between, before, and after a point at which the values of two inputs of said differential amplifer, one of which is a sawtooth signal, become equal. Therefore, the following remarkable advantages can be obtained; namely (1) the pulse width can be controlled very precisely by designing the system such that both the inputs of the differential amplifiers are of the order of at least several volts, because the input active region in the input-output characteristic of the differential amplifier is only several mV thus insuring rapid and accurate switching times which, in turn, determine the duration of fuel injection drive pulses, and (2) where pulses of the same width are desired to be obtained from a plurality of differential amplifiers for the same purpose, any noticeable width difference between the pulses can be made extremely small by simply making the rise inclinations or slopes of the respective sawtooth waves the same by adjusting the resistor 27 in the integrating circuit of each amplifier as shown in FIG. 3, so that an ideal fuel injection control is possible no matter how high the engine speed and how large the number of cylinders may be.

Figure 11:
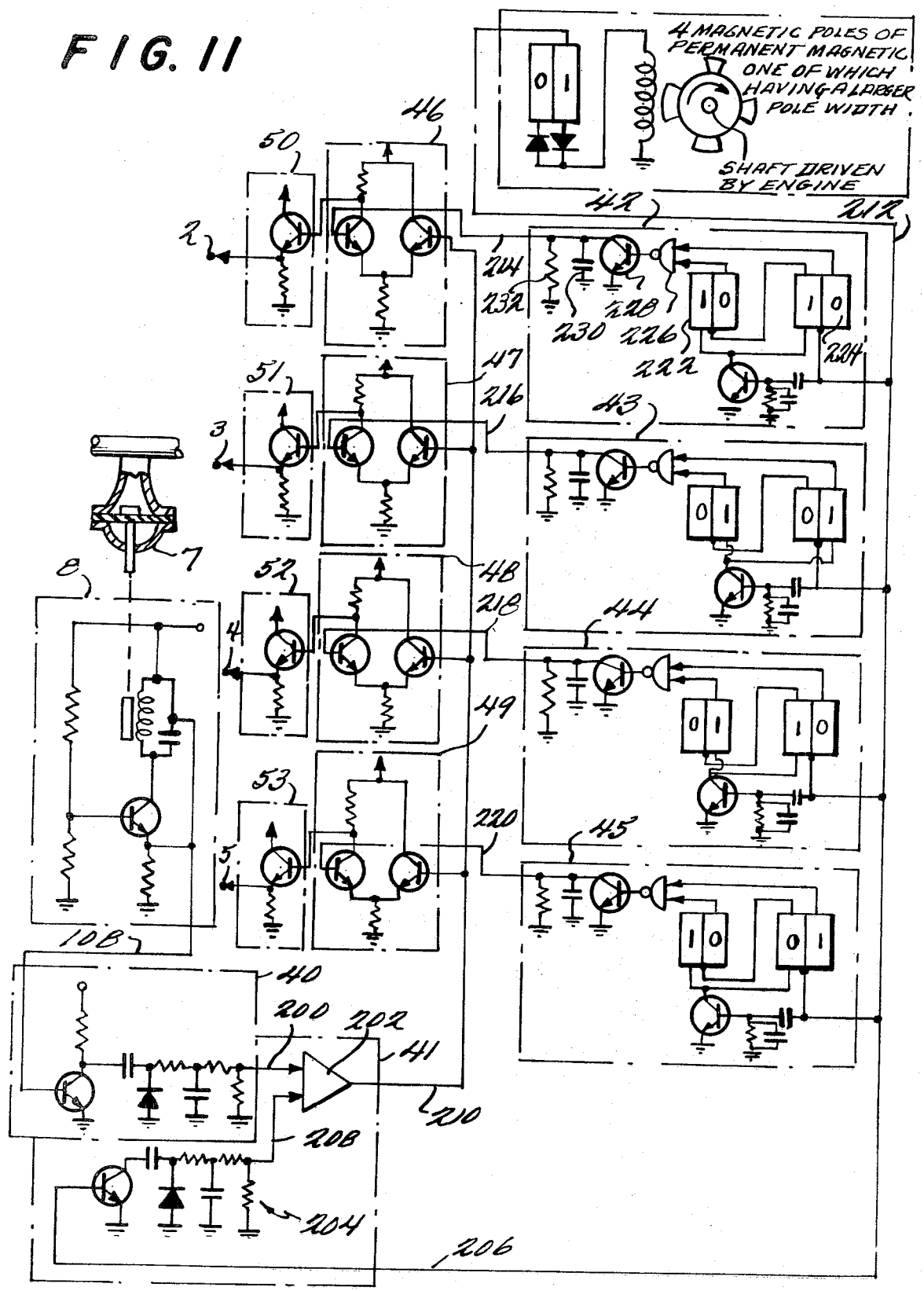
FIG. 11 is a more detailed schematic diagram of the FIG. 7 embodiment.

The FIG. 7 embodiment is shown in more detail at FIG. 11. Here, the manifold back-pressure detector 7 and a variable frequency oscillator 8 are exactly as previously discussed with respect to FIG. 9. Thus, the output on line 8 is an electrical signal having a frequency approximately inversely proportional to the instantaneous manifold back-pressure. This signal is input to a frequency-to-voltage converter 40 which is exactly similar to the frequency-to-voltage converter 12 previously discussed. This type of circuit is also sometimes referred to as a digital-to-analog converter in that the digital signals on line 108 having a frequency that varies as a predetermined function of back-pressure are converted into a d.c. output signal at line 200 having a d.c. voltage proportional to the input frequency on line 108. The adjusting circuit 41 includes a conventional operational amplifier 202 having one of its inputs connected to receive the output from frequency-to-voltage converter 40 as shown in FIG. 11. The other input of operation amplifier 202 is connected to receive the output of a further frequency-to-voltage converter shown generally by reference numeral 204 which is utilized to convert the frequency of a r.p.m. signal on line 206 from pulse generator 11 into a d.c. input voltage for operational amplifier 202 having a level proportion to the engine r.p.m. Thus, operational amplifier 202 combines the signal on line 200 related to manifold back-pressure with the r.p.m. signal on line 208 to produce a composite reference signal on line 210 which is then input to the noninverting input of differential amplifiers 46, 47, 48 and 49, all being of a conventional differential amplifier circuit design as previously discussed with respect to previous embodiments. The inverting inputs of the differential amplifiers 46, 47, 48 and 49 are connected to receive the sawtooth or ramp-shaped output signals from sawtooth generators 42, 43, 44 and 45 respectively.

In the FIG. 9 embodiment, only two differential amplifiers were utilized (for the four-cylinder embodiment) with the output from each differential amplifier being used to selectively actuate one of two fuel injection valves depending upon the instantaneous condition of a distributor (binary counter and gating circuits) associated with each differential amplifier. In this FIG. 11 embodiment, a separate control channel, each channel having its own sawtooth generator and differential amplifier, is provided for each fuel injection valve 2, 3, 4 and 5 as shown in FIG. 11.

Thus, since each valve has a separate control channel, the pulse generator 11 used with this latter embodiment differs somewhat from the previously discussed pulse generator 11 in that four magnetic poles are utilized to provide a separate output pulse in correspondence to the desired injection timing for each of the engine cylinders. For instance, the typical waveforms produced on line 212 as input to sawtooth generators 42–50 from the four-pole pulse generator are shown in FIG. 12. As before there is one wider than usual magnetic pole to provide a wider than usual reference pulse once each engine cycle. These inputs to the sawtooth generators drive two-stage binary counters as shown, each comprising two conventional bistable multivibrators or flip-flops connected in cascade to provide a binary counter having a maximum of four different possible stable states and which counter is cycled continuously through each of the successive four possible stable states by the successive input pulses supplied along line 212 from the pulse generator 11. Of course, the reference pulses insure synchronous operation by positively resetting each counter to a predetermined state once each engine cycle.

A particular one of the stable states in each of the sawtooth generators is then detected logically such as by using a conventional NOR gate to cause resetting of the integrator circuits (similar to those discussed with respect to FIG. 3) at the proper crank angle (as determined by the circumferential placement of the magnetic poles in the pulse generator 11) to insure that the sawtooth waveforms on lines 214, 216, 218 and 220 are each staggered with respect to one another in an appropriate manner as shown in FIG. 12.

That is, as shown in FIG. 11, sawtooth generator 42 includes flip-flops 222 and 224 having respective states (1, 0 and 1, 0) as shown. NOR gate 226 is connected such that if flip-flops 222 and 224 have just reached the states indicated in the drawing, then NOR gate 226 will have just provided an output pulse to turn "on" transistor 228 momentarily thereby discharging capacitor 230 and causing the ramp signal on line 214 to be quickly returned to its lowest or ground state of potential. Thereafter, the capacitor 230 will begin charging again through resistor 232. As previously discussed, when the ramp signal on line 214 (caused by the charging of capacitor 230 through resistor 232 exceeds the reference signal on line 210 then, differential amplifier 46 will switch such that the output therefrom is reversed to deenergize the driver 50 and thereby close the electromagnetic fuel injection valve 2.

When the next trigger pulse from the r.p.m. pulse generator 11 is received over line 212, all the two-stage binary counters in the various sawtooth generators will advance by one count such that the counter in sawtooth generator 43 then assumes a logical state (1, 0 and 1, 0) which causes resetting of the capacitor charging circuitry associated with that sawtooth generator such that the sawtooth waveform on line 216 is then quickly returned to its zero or ground state potential which, in turn, causes an inversion of the output of differential amplifier 47 (assuming at least some reference signal on line 210) such that the driver 51 is turned "on" to energize the electromagnetic fuel injection valve 3. Of course, as the capacitor charging circuit in the sawtooth generator 43 continues to charge, the sawtooth waveform on line 216 will eventually surpass the reference signal on line 210 causing the differential amplifier 47 to again revert to its formal output state thus deactuating the driver 51 and deenergizing the electromagnetic fuel injection valve 3. As should now be apparent, this cycle is repeated with sawtooth generators 44 and 45 before the whole cycle starts over again with sawtooth generator 42 as should now be apparent and as indicated by the waveforms shown in FIG. 12.

Of course, AND gates or other logical function gates could be used instead of NOR gates provided they are properly connected to the counter stages to produce the desired value actuation sequences. Further, although the counters in the sawtooth generators 42–45 are all shown as being reset to different states by the wide reference pulse to insure the desired time-staggered sawtooth outputs, those in the art will readily appreciate that the counters could all count in unison provided the logical gating circuitry for resetting each integrating circuit is properly connected to fire on successive counter states. In this manner, a single common counter could be used to achieve distribution (i.e., the desired time-staggered sequencing of the sawtooth waves) if desired.

Figure 15:
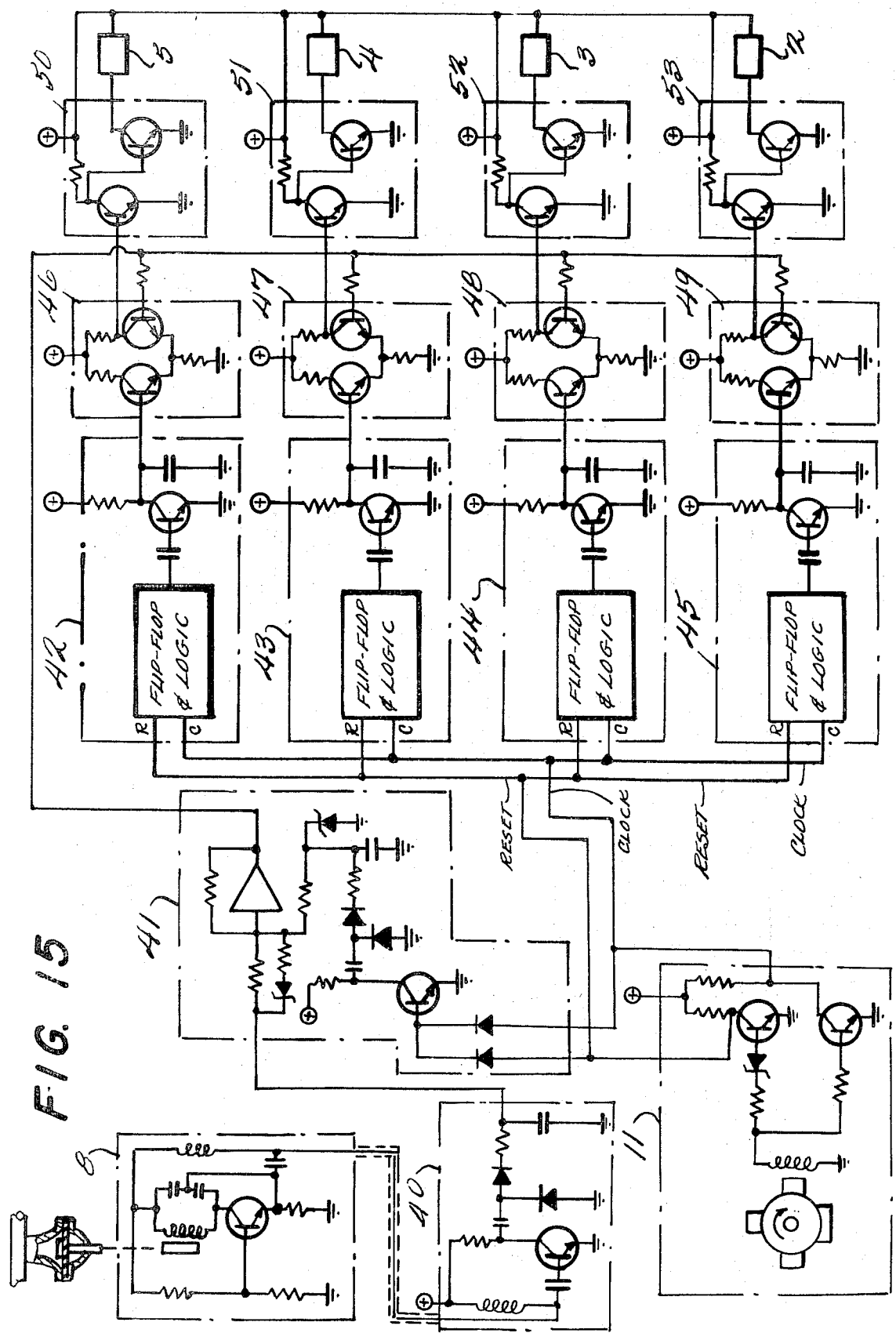
FIG. 15 is a circuit diagram showing another example of a possible detailed construction for the embodiment of FIG. 7.

FIG. 15 shows another example of a possible detailed circuit construction for the embodiment of FIG. 7. The output of the oscillator 8, which represents the negative pressure of the engine, is converted by the converter 40 and the adjusting circuit 41 into a d.c. voltage and appears at the output terminal of the adjusting circuit 41. Each of the flip-flop and logic circuits of the distributors 42 to 45 operates to select an injection signal for a corresponding cylinder at every four pulses in accordance with the reset and clock signals as should now be apparent.

Each selected injection signal is then used as an injection "start" signal to start a corresponding sawtooth wave. The sawtooth waves (62 in FIG. 8) have the same inclination which inclination is determined by the values of the resistance R and capacitance C in the sawtooth generators 42 to 45. The sawtooth outputs are applied to the respective differential amplifiers 46 to 49 to be compared with the output of the adjusting circuit 41, thereby determining the pulse width as shown in FIG. 8. The pulse width is small as indicated by 64 when the negative pressure is high and large as indicated by 63 when the negative pressure is low. The electromagnetic valves 2 to 5 are controlled in accordance with the outputs of the respective differential amplifiers.

Figure 16:
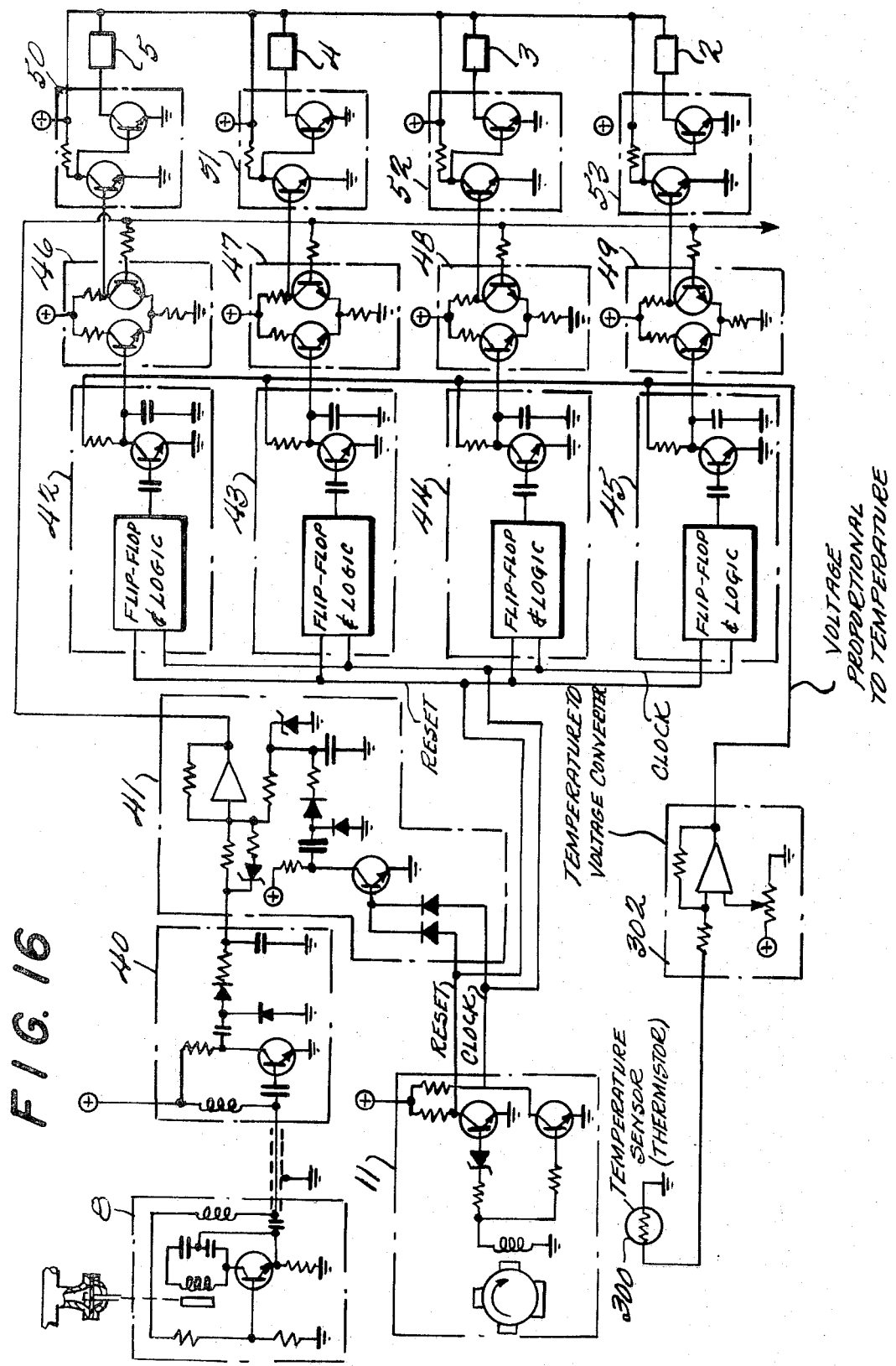
FIG. 16 shows a further embodiment of the FIG. 7 circuit including temperature compensation.

Another modified embodiment of the basic FIG. 7 circuit is shown in FIG. 16. In this Figure, reference numeral 300 designates a temperature sensor (mounted on the engine), numeral 302 a temperature-to-voltage converting means for producing a voltage corresponding to a temperature detected by the temperature sensor. It satisfies a requirement such that, when the engine temperature is low, more fuel supply is required as compared with the case when the engine temperature is high even under the same load condition.

The slope of the sawtooth wave is then varied in this exemplary embodiment with the engine temperature to be relatively more gentle for a low engine temperature and to be relatively steeper when the engine becomes warmer. This is accomplished by making the temperature dependent voltage as input to the sawtooth generators rather than a constant supply voltage as before.

On the other hand, the DC voltage level is varied in accordance with intake manifold vacuum pressure and engine r.p.m. as before, the said DC voltage level being increased when the engine is under a heavy load requiring much fuel supply. With this construction, the width of the driving pulse is increased when the engine temperature is low even under a constant engine load (at a constant DC voltage level) as should now be apparent.

The detailed circuit construction of this embodiment is shown in FIG. 16 which is substantially the same as that of FIG. 15 except for a small portion thereof as should be apparent so no further detailed description should be necessary.

A further possible modification to the FIG. 7 embodiment involves providing a constant power source voltage instead of an engine parameter dependent one as the DC level input to differential amplifiers 46–49. For instance, in this embodiment, the output of converter 40 is used as a supply for the sawtooth generators 42–45 (as in FIG. 16 the temperature dependent signal is as used) and the lower inputs to amplifiers 46–49 in FIG. 7 are constant DC signals as for instance from a potentiometer. The DC voltage signal is maintained constant and the slope of the sawtooth wave is then varied in accordance with the intake manifold vacuum pressure as should now be apparent In a modification of FIG. 1 a constant voltage from a device such as a potentiometer connected between a d.c. source and ground may be employed in place of the signal which is supplied from the pulse generator 11 through the converter 12 to the differential amplifiers 13 and 14 shown in FIG. 1, which gives a circuit construction having the same function as the just previously discussed circuit. However, these circuits would appear to be quite different from each other, because, in FIG. 1, the outputs of the differential amplifiers 13 and 14 are distributed by the distributors 15 and 16 as will be apparent to those in the art.

In any event, taking into account the many possible variations of this invention, it is apparent that many of the advantages of the present invention reside in the use of a pulse generating device for use in an electric fuel injection control system for controlling the fuel injection in accordance with at least one engine operating parameter. Under the above discussed principles, the features of such device will include sawtooth signal generator means, d.c. voltage signal generator means and differential circuit means for comparing the output voltages of these signal generator means to determine the duration of the driving pulses. At least one of the slope of the sawtooth wave or the level of the d.c. voltage signal is representative of at least one engine operating parameter.

Although only a few embodiments of this invention have been specifically described and discussed in the foregoing specification, those skilled in the art will readily appreciate that many modifications of the exemplary embodiments of this invention may be affected without materially changing the mode of operation and/or essentially improved results of this invention. Accordingly, all such modifications are intended to be within the scope of this invention.

What is claimed is:

1. A driving pulse generating device in an electric fuel injection control system for independently controlling the duration of driving pulses provided through driving units to actuate fuel injection valves in an engine in accordance with at least one engine operating parameter, said device comprising:
   first generator means for generating a sawtooth wave signal having a frequency corresponding to a repeating operation of an intake valve of said engine, said sawtooth wave signal having a characteristic slope,
   second generator means for generating a d.c. voltage signal having a characteristic magnitude,
   input means comprising a variable inductor mechanically coupled to a movable control element on said engine and adapted to control the frequency of an electrical oscillator connected to at least one of said first and second generator means for applying a signal representing at least one engine operating parameter to said at least one generator means and to cause the respectively corresponding said characteristic of said at least one generator means to be related to said at least one engine operating parameter, and
   differential circuit means connected to said first and second generator means for comparing said sawtooth wave signal and said d.c. voltage signal and for generating said driving pulses having a duration determined by detecting when the level of said sawtooth wave signal becomes substantially equal to the magnitude of said d.c. voltage signal, and wherein
   said first generator means comprises,
      integrating means connected to said input means for integrating a signal generated by said input means to thereby produce an output signal having a slope representing at least one engine operating parameter; and
      switching means connected to said integrating means for periodically restoring the level of said output signal of said integrating means to a reference level in time with said repeating valve action thereby maintaining said sawtooth wave signal in synchronism with the repeatvalve action and
   said second generator means comprises means for supplying a constant d.c. voltage.

2. A driving pulse generating device as in claim 1, wherein said input means comprises:
   controllable variable frequency oscillator means for producing a first signal having a frequency corresponding to intake manifold vacuum pressure; and
   monostable multivibrator means connected to said oscillator means for producing a second signal comprising uniform pulses having a frequency equal to that of said first signal, said second signal being applied to said first generator means.

3. A driving pulse generating device in an electric fuel injection control system for independently controlling the duration of driving pulses provided through driving units to actuate fuel injection valves in an engine in accordance with at least one engine operating parameter, said device comprising:
   first generator means for generating a sawtooth wave signal having a frequency corresponding to a repeating operation of an intake valve of said engine, said sawtooth wave signal having a characteristic slope, second generator means for generating a d.c. voltage signal having a characteristic magnitude, input means comprising a variable inductor mechanically coupled to a movable control element on said engine and adapted to control the frequency of an electrical oscillator connected to at least one of said first and second generator means for applying a signal representing at least one engine operating parameter to said at least one generator means and to cause the respectively corresponding said characteristic of said at least one generator means to be related to said at least one engine operating parameter, and differential circuit means connected to said first and second generator means for comparing said sawtooth wave signal and said d.c. voltage signal and for generating said driving pulses having a duration determined by detecting when the level of said sawtooth wave signal becomes substantially equal to the magnitude of said d.c. voltage signal, and wherein said first generator means comprises:

integrating means connected to said input means for integrating a signal generated by said input means to thereby produce an output signal having a slope representing one of at least two engine operating parameters; and switching means connected to said integrating means for periodically restoring the level of said output signal of said integrating means to a reference level thereby maintaining said sawtooth wave signal in synchronism with the repeating operation of an intake valve of said engine; and said second generator means comprises:

means connected in circuit with another input means for generating said d.c. voltage signal having a magnitude representing the other one of said engine operating parameters.

4. A driving pulse generating device as in claim 3, wherein said input means comprises:

a controllable variable frequency oscillator means for producing a first signal having a frequency corresponding to intake manifold vacuum pressure;

monostable multivibrator means connected to said oscillator means for producing a second signal comprising uniform pulses having a frequency equal to that of said first signal, said second signal being applied to said first generator means; and a pulse generator means for producing an output pulse signal in synchronization with the repeating operation of an intake valve of said engine, said output pulse signal thereby having a frequency representing engine r.p.m. and being applied to said first generator means.

5. A driving pulse generating device in an electric fuel injection control system for independently controlling the duration of driving pulses provided through driving units to actuate fuel injection valves in the cylinders of an internal combustion engine in accordance with at least one engine operating parameter, without including a pulse distributor said device comprising:

separate first generator means for each cylinder of said engine for generating a sawtooth wave signal having a frequency corresponding to a repeating operation of an intake valve of said engine, said sawtooth wave signal having a constant characteristic slope and including switching means for periodically restoring the signal to a reference level thereby maintaining said sawtooth wave signal in synchronism with the repeating operation of an intake valve of said engine, second generator means for generating a d.c. voltage signal having a characteristic magnitude representing at least one engine operating parameter, input means connected to said second generator means for applying a signal representing at least one engine operating parameter to said second generator means and thus to cause the respectively corresponding said characteristic magnitude to be related to said at least one engine operating parameter, and separate differential circuit means being provided for each cylinder of said engine and being individually connected to said first generator means and connected in common to said second generator means for individually comparing a respectively corresponding one of said sawtooth wave signals and said d.c. voltage signal and for individually generating for each respectively corresponding cylinder said driving pulses having a duration determined by detecting when the level of said sawtooth wave signal becomes substantially equal to the magnitude of said d.c. voltage signal.

6. A driving pulse generating device as in claim 5, wherein said input means comprises:

controllable variable frequency oscillator means for producing a first signal having a frequency corresponding to intake manifold vacuum pressure;

frequency-to-voltage converter means connected to said oscillator means for generating a voltage signal in response to said first signal, said voltage signal being applied to said second generator means; and pulse generator means for generating an output pulse signal in synchronization with the repeating operation of an intake valve of said engine. said output pulse signal having a frequency representing engine r.p.m. and being applied also to said second generator means.

7. A driving pulse generating device as in claim 3, wherein said input means comprises:

temperature-to-voltage converter means for producing a d.c. voltage signal representing engine temperature, said d.c. voltage signal being applied to said first generator means;

controllable variable frequency oscillator means for producing a first signal having a frequency corresponding to intake manifold vacuum pressure;

frequency-to-voltage converter means connected to said oscillator means for generating a voltage signal in response to said first signal, said voltage signal being applied to said generator means; and pulse generator means for generating an output pulse signal in synchronization with the repeating operation of an intake valve of said engine, said output pulse signal having a frequency representing engine r.p.m. and being applied also to said second generator means.

8. An electric fuel-injection control system in which driving pulses for fuel injecting electromagnetic valves are controlled by the back pressure and the r.p.m. of an engine, said system comprising:

an oscillator means for generating a signal voltage having a frequency corresponding to said back pressure including a variable inductor mechanically coupled to said engine so as to produce changes in its electrical inductance in response to changes in engine manifold pressure, said variable inductor also being electrically connected in said oscillator means so as to cause the frequency of said signal voltage to change in response to changes in the manifold pressure, first means operatively connected to said oscillator means for generating a sawtooth wave voltage having a rising rate corresponding to the frequency of said signal voltage and a period corresponding to the r.p.m. of the engine, a pulse generator means for generating an r.p.m. voltage having a frequency corresponding to the r.p.m. of the engine, second means operatively connected to said pulse generator means for generating a d.c. voltage having a magnitude corresponding to the frequency of said r.p.m. voltage, a plurality of differential amplifier means, each having respective inputs connected to said first and to said second means for generating a rectangular output pulse having a width which is a predetermined function of said back pressure of the engine and having a repetition rate corresponding to the r.p.m. of the engine, said width being derived by comparing said sawtooth wave voltage and said d.c. voltage from said first and second means, and a plurality of driving units each operatively connected between one of said differential amplifiers and a corresponding one of said electromagnetic valves for amplifying said rectangular pulses and for producing said driving pulses to control said electromagnetic valves.

9. A fuel injection system as in claim 8, wherein said first means comprises a sawtooth generator including:

a monostable multivibrator for generating uniform pulses having a frequency equal to that of the signal voltage generated by said oscillator corresponding to said back pressure, an integration circuit for integrating said uniform pulses generated by said monostable multivibrator, and switching means connected to said pulse generator means for stopping the integrating operation of said integration circuit, said switching means being turned on and off by said pulse generator.

10. An electric fuel-injection control system in which driving pulses for fuel injecting electromagnetic valves are controlled by the back pressure and the r.p.m. of an engine, said system comprising:

an oscillator means for generating a signal voltage having a frequency corresponding to said back pressure, including a variable inductor mechanically coupled to said engine so as to produce changes in its electrical inductance in response to changes in engine manifold pressure, said variable inductor also being electrically connected in said oscillator means so as to cause the frequency of said signal voltage to change in response to changes in the manifold pressure, first means operatively connected to said oscillator means for generating a d.c. voltage having a magnitude corresponding to the frequency of said signal voltage, a pulse generator means for generating an r.p.m. voltage having a frequency corresponding to the r.p.m. of the engine, second means operatively connected to said pulse generator means for generating a sawtooth wave voltage having a rising rate corresponding to the frequency of said r.p.m. voltage and having a period corresponding to the r.p.m. of said engine, a plurality of differential amplifier means, each having inputs respectively connected to said first and to said second means for generating a rectangular output pulse having a width corresponding to said back pressure and a repetition rate corresponding to the r.p.m. of the engine, said width being derived by comparing said d.c. voltage and said sawtooth wave voltage from said first and second means, and a plurality of driving units each operatively connected between one of said differential amplifiers and a corresponding one of said electromagnetic valves for amplifying said rectangular pulses and for producing said driving pulses to control said electromagnetic valves.

11. An improvement for an electric fuel injection control system used for controlling the time duration of driving pulses to fuel injection valves in accordance with at least two engine operating parameters, said improvement comprising:

first generator means for generating a sawtooth shaped signal having a slope representative of at least a first engine operating parameter, said first generator means including a variable inductor coupled to said engine so as to produce changes in its electrical inductance in response to changes in engine manifold pressure and a controllable oscillator electrically connected to said inductor so as to cause the operating frequency of said oscillator to also change in response to changes in the engine manifold pressure, second generator means for generating a d.c. signal having a magnitude representative of at least a second engine operating parameter, and differential circuit means connected to said first and second means for comparing said sawtooth shaped signal and said d.c. signal and for generating said driving pulses having a time duration determined by the times at which said sawtooth shaped signal substantially equals the magnitude of said d.c. signal.

12. An improvement as in claim 11 wherein said first generator means comprises:

a monostable multivibrator means connected to said oscillator means for producing a second signal comprised of uniform pulses having a frequency equal to that of said first signal, and a plurality of integrating means, each connected to said multivibrator means for integrating said second signal thereby providing an output signal having a slope corresponding to said back pressure.

13. An improvement as in claim 12 wherein said second generator means comprises:

a pulse generator means for generating an output pulse in response to the operation of each engine intake valve and therefore providing an output signal having a frequency representative of engine r.p.m., and a frequency-to-voltage converter means connected to said pulse generator means for generating said d.c. signal in response to said output signal of said pulse generator means.

14. An improvement as in claim 13 wherein each of said integrating means of said first generator means includes a switching means connected to said pulse generator means for periodically returning the output signal of said integrating means to a reference level thereby resulting in said sawtooth shaped signal being synchronous with the operation of said intake valves.

15. An improvement as in claim 13 wherein said first generator means comprises:

a pulse generator means for generating an output pulse in response to the operation of each engine intake valve and therefore providing an output signal having a frequency representative of engine r.p.m., and a plurality of integrating means, each connected to said pulse generator means for integrating said output signal therefrom and thereby providing an output signal having a slope representative of said engine r.p.m.

16. An improvement as in claim 15 wherein said second generator means comprises:

a controllable variable frequency oscillator means for producing a first signal having a frequency related to said back pressure, and a frequency-to-voltage converter means connected to said oscillator means for generating said d.c. signal in response to said first signal.

* * * * *